US005883662A

United States Patent [19]
Zanen

[11] Patent Number: 5,883,662
[45] Date of Patent: *Mar. 16, 1999

[54] APPARATUS FOR THREE-DIMENSIONAL MEASUREMENT AND IMAGING HAVING FOCUS-RELATED CONVERGANCE COMPENSATION

[76] Inventor: Pieter O. Zanen, 107 Cayuga Heights Rd., Ithaca, N.Y. 14850

[ * ] Notice: The term of this patent shall not extend beyond the expiration date of Pat. No. 5,532,777.

[21] Appl. No.: 711,237

[22] Filed: Sep. 9, 1996

Related U.S. Application Data

[60] Division of Ser. No. 659,164, Jun. 5, 1996, which is a continuation-in-part of Ser. No. 470,130, Jun. 6, 1995, Pat. No. 5,532,777.

[51] Int. Cl.⁶ .................................................. H04N 13/02
[52] U.S. Cl. .............................................. 348/49; 348/46
[58] Field of Search ................................ 348/42, 43, 44, 348/45, 46, 49, 50; 352/57, 60; 356/3.14, 3.15, 3.16; 396/324, 326, 331, 333, 322; H04N 13/02

[56] References Cited

U.S. PATENT DOCUMENTS

| | | | |
|---|---|---|---|
| 2,413,996 | 1/1947 | Ramsdell | 396/331 |
| 2,736,250 | 2/1956 | Papritz | 396/331 |
| 3,254,933 | 6/1966 | Latulippe | 352/57 |
| 3,891,313 | 6/1975 | Murphy | 353/8 |
| 4,178,090 | 12/1979 | Marks et al. | 396/331 |
| 4,436,369 | 3/1984 | Bukowski | 359/462 |
| 4,437,745 | 3/1984 | Hajnal | 348/42 |
| 4,523,226 | 6/1985 | Lipton et al. | 348/49 |
| 4,525,045 | 6/1985 | Fazekas | 352/57 |
| 4,568,970 | 2/1986 | Rochstead | 348/49 |
| 4,583,117 | 4/1986 | Lipton et al. | 348/47 |
| 4,687,310 | 8/1987 | Cuvillier | 396/327 |
| 4,967,267 | 10/1990 | Gallaher | 348/49 |
| 5,119,234 | 6/1992 | Van Der Walt | 359/472 |
| 5,349,403 | 9/1994 | Lo | 396/324 |
| 5,532,777 | 7/1996 | Zanen | 348/49 |

FOREIGN PATENT DOCUMENTS

| | | |
|---|---|---|
| 0 416 727 A3 | 7/1990 | European Pat. Off. . |
| 2251810 | 9/1990 | Japan . |
| 634092 | 8/1946 | United Kingdom . |

OTHER PUBLICATIONS

Zane, P.O., 1993, A Comparative Study of the Role of Vison and Olfaction During In–Flight Maneuvers in Wind by Four Species of Insects to Semiochemicals, Abstract, Dept. Of Entomoloy pp. 1–174.

Primary Examiner—Tommy P. Chin
Assistant Examiner—Y. Lee
Attorney, Agent, or Firm—Brown, Pinnisi & Michaels, PC

[57] ABSTRACT

An apparatus for creating a pair of images for use in stereo photography or photogrammetry, and adjusting the overlap of the images by automatically adjusting the convergence of a pair of image gathering devices and by placing an adaptor having a set of mirrors located in front of a camera lens. The outer two mirrors face generally outward along the optical axis of the lens. The centers of the outer two mirrors are spaced apart by an appropriate interocular distance. The convergence of the two outer mirrors is adjustable by swiveling them simultaneously and equally about their centerlines with a ganging mechanism. A focusing sensor is used to provide a distance signal, which is then used to adjust the convergence of the mirrors in response to the distance of the subject, so as to maximize the overlap between the left and right images. In an alternate embodiment, the pair of images are generated by a pair of imaging sensors mounted in place of the outer mirrors. A method of photogrammetry using the apparatus of invention to determine the position of an object in three dimensions is presented.

20 Claims, 3 Drawing Sheets

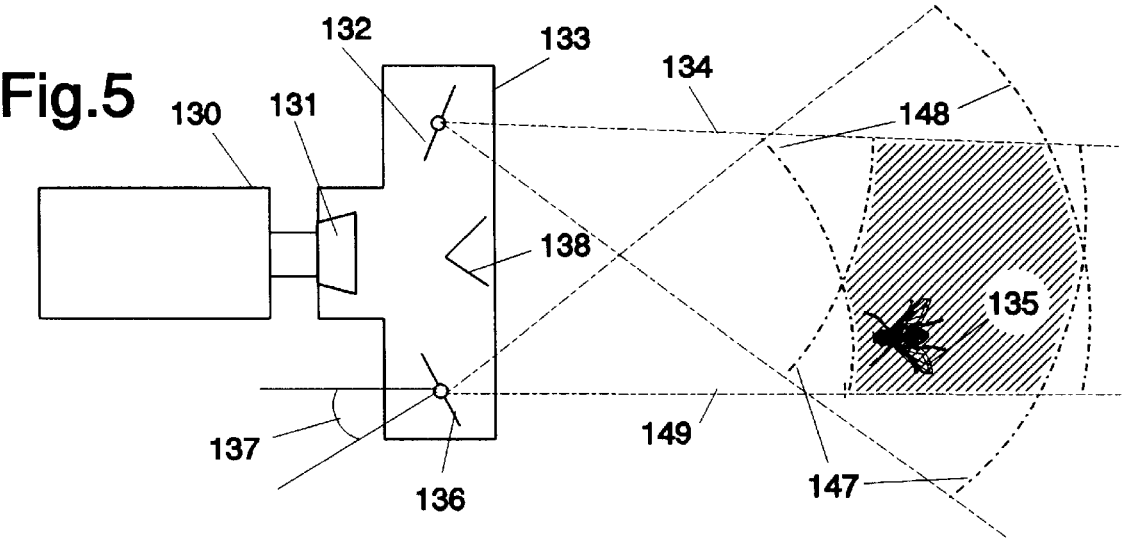
Fig.5
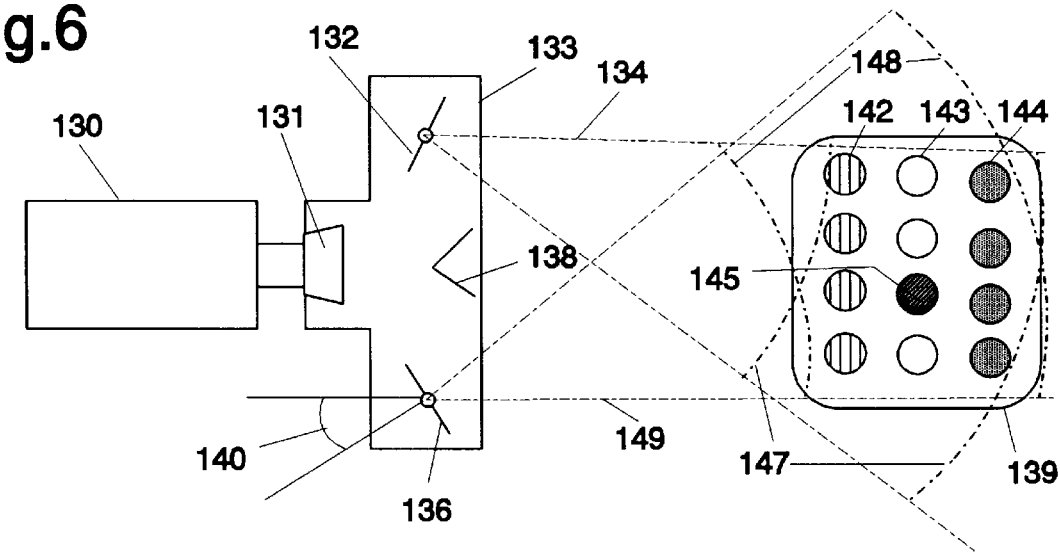
Fig.6
Fig.7
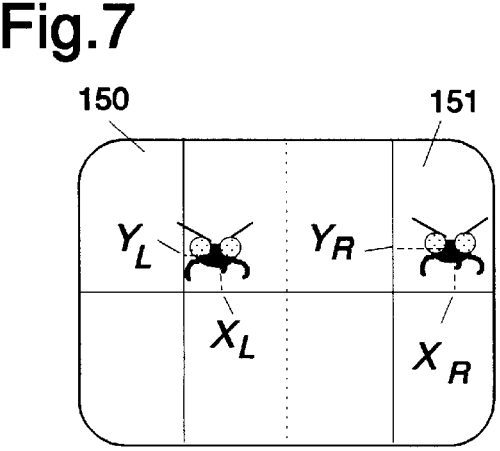
Fig.8
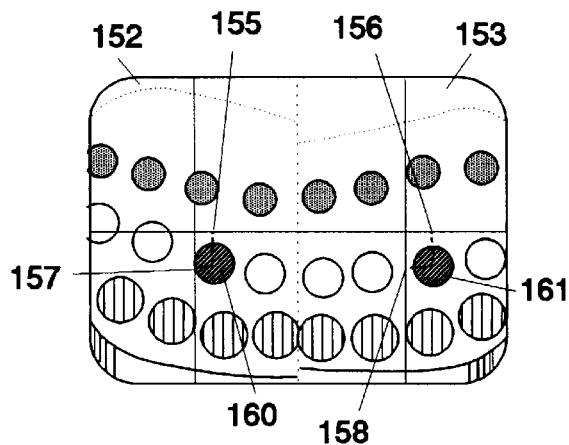

APPARATUS FOR THREE-DIMENSIONAL MEASUREMENT AND IMAGING HAVING FOCUS-RELATED CONVERGANCE COMPENSATION

REFERENCE TO RELATED APPLICATIONS

This is a divisional application of copending application Ser. No. 08/659,164, entitled "METHOD AND APPARATUS FOR THREE-DIMENSIONAL MEASUREMENT AND IMAGING HAVING FOCUS-RELATED CONVERGENCE COMPENSATION", filed Jun. 5, 1996; which was a continuation-in-part of co-pending application Ser. No. 08/470,130, filed Jun. 6, 1995, entitled "SINGLE LENS APPARATUS FOR THREE-DIMENSIONAL IMAGING HAVING FOCUS-RELATED CONVERGENCE COMPENSATION", now U.S. Pat. No. 5,532,777, issued Jul. 2, 1996.

FIELD OF THE INVENTION

The invention pertains to the field of stereographic or "3D" photography and photogrammetry.

More particularly, the invention pertains to apparatus to permit acquisition of simultaneous left and right views which maximizes the overlap of the views by adjusting the convergence angle of the image-forming means in relation to the distance to the subject. Also presented is a method for the use of the apparatus in photogrammetry (deriving measurements in three dimensions from the multiple images).

BACKGROUND OF THE INVENTION

Stereographic photography is the method of producing images which are apparently three dimensional by recording separate left- and right-eye images. The viewer reconstructs the 3-D image by viewing the two separate 2-D images simultaneously. Stereographic photography has been known since at least the late 19th century, when stereo viewers were a popular parlor accessory.

Such stereo views have historically been created with two lenses on a single camera, spaced apart by approximately the inter-ocular distance of a human head. The Stereo Realist™ series of 35 mm still cameras, popular in the 1950's, are an example of this kind of imaging. Left and right views were recorded simultaneously through two lens/shutter sets on alternate frames of the 35 mm film. The later Nimslo™ system used four lenses for essentially the same approach.

Stereo movies appeared in the 1950's. The images were typically created either using two synchronized cameras, or a two-lens system on a single camera. Similarly, the various Stereo TV systems have typically used two cameras (see Lipton, et al, U.S. Pat. No. 4,583,117) or a single camera with two lenses (Lipton, et al, U.S. Pat. No. 4,523,226).

All of the multiple-camera systems have severe drawbacks, in the added complexity and cost of duplicating the complete camera system and the synchronization of the two separate images (this is especially a problem in film (non-video) applications). In addition, the use of two separate lenses (whether on one camera or two) introduces problems of synchronizing focus and view.

The need for solving this latter problem is real, but not addressed by prior art devices. Simply mounting two cameras side-by-side will allow the taking of the left- and right-eye images, and the cameras can be focused on whatever the subject is (although follow-focus of moving objects is problematic). However, there is more to stereoscopic vision than simply having two eyes. A simple experiment will demonstrate the problem. If one holds up a finger at arms length, and brings it closer and closer to the face, it becomes apparent that your eyes do more than merely focus on the finger as it approaches. You also aim each eye independently, becoming more and more "cross-eyed" as the finger nears the face. Without this adaptation, most 3-D films tended to induce discomfort as the apparent image distance to the view changed, since the camera views would not shift as one's instinct might expect.

In addition, fixed convergence or partially or manually adjustable convergence systems do not address the problem that the overlap of the views must change as the focus and/or focal length of the lens changes. The overlap of the two images should be maximized, especially in systems which digitize the two images and use the information to form a three dimensional picture of the surroundings. This process of making precise measurements by means of photography is called "photogrammetry".

There have been a number of devices aimed at simplifying the stereographic process by allowing use of a single camera to take the two images. Most of these use a number of mirrors or prisms, either in front of the camera lens or between a secondary lens and a pair of primary lenses.

One method, useful only with motion pictures, is to sequentially record the two images on alternate. frames of the film or video. For film, a synchronized spinning mirror is used to select the view to be recorded in synch with the film gate or video scan. For such a device, see Latulippe, U.S. Pat. No. 3,254,933. In video, the system electronically selects alternate frames from two sources. This method has several disadvantages, requiring complicated synchronized glasses for viewing and being applicable only to movie or video applications.

The other alternative is to record both images simultaneously on each frame, side-by-side or one above the other. This method is applicable to any form of photography, still or moving, silver image or video. Viewing is simplified, since both images are always present, and the adapter to use a single lens does not need to be synchronized to the film transport or video scan.

Simple prism- or mirror-based stereographic adapters have been available for still cameras for some time. They fit in front of the camera lens in the same manner as an accessory close-up or telephoto adapter. They have no means for adjusting the adapter for convergence or focus as the subject-lens distance changes.

Marks, et al, U.S. Pat. No. 4,178,090, creates vertically displaced left and right images on a single frame using an attachment in front of a single lens. One image is straight-through, with the second being taken through a pair of prisms. An adjustable block in front of the lens is solid glass on the top and reflective on the bottom. Convergence is adjusted as the lens is focused by mechanically coupling a rotation control for the adjustable block and a worm gear rotating the lens focus control. This adjustment is insufficient for true automatic convergence control with focus, as only one of the two views changes angle as the block is rotated.

Bukowski (Optimax III, Inc.) U.S. Pat. No. 4,436,369, shows a mirror-based adapter using two primary lenses with ganged focusing mechanisms. Two pairs of fixed mirrors direct the left and right images to the top and bottom of the film frame. The optical axes of the lenses are parallel and fixed, which means that the convergence or aim point of the two lenses is not changed as the lenses are focused.

Fazekas (Panavision, Inc.) U.S. Pat. No. 4,525,045, also has two primary lenses and two pairs of fixed mirrors/ prisms. A "horizon adjustment" is provided to allow the cameraman to move one lens to compensate for the vertical displacement of the two lenses, but the optical axes of the lenses are fixed and parallel.

Rockstead, U.S. Pat. No. 4,568,970, uses an adapter which fits in front of the lens of a television camera. Pairs of mirrors (FIG. 1) or prisms (FIG. 2) are used to create the pair of images on the video frame, and a similar device in front of the viewer's eyes reconstructs the two images back into a 3-D single image. A knob allows the operator to manually adjust the convergence of optical axes of the mirrors/prisms to create the two side-by-side images.

The inventor's published Ph.D. thesis describes the use of multiple images from multiple cameras in photogrammetry: "A Comparative Study of the Role of Vision and Olfaction During In-flight Maneuvers in Wind by Four Species of Insects to Semiochemicals", Pieter Olivier Zanen, University of Massachusetts, May 1993 (UMI Dissertation Services Order No. 93-29,684). The use of more than one camera to derive the images used in the photogrammetry limits one to a static setup, and when using electronic analysis of a moving subject, requires exact synchronization of the cameras so that the two images are taken at exactly the same time.

The parent application to this continuation-in-part taught an apparatus for automatically adjusting the convergence of the angles of view of the two imaging mirrors in response to the focusing of the camera.

SUMMARY OF THE INVENTION

The invention presents an apparatus for generating a pair of images of a subject, left and right, in which the overlap of the images is maximized by adjusting the convergence of the image-collecting means in response to the distance from the subject. The apparatus of the invention is especially useful for photogrammetry, and particularly close-range photogrammetry, because if one has two images, and knows how the images were made (i.e. the convergence of the image-generators), one can derive the position of an object in the image in three-dimensions by appropriate choice of a calibration map.

In a preferred embodiment, the invention comprises an adapter having a set of four mirrors in two pairs located in front of a camera lens. The centers of the four mirrors are all aligned on a common centerline, with the outer two mirrors facing generally outward along the optical axis of the lens and the inner two mirrors facing generally inward into the lens. The centers of the outer two mirrors are spaced apart by an appropriate interocular distance. The two inside mirrors are together large enough to cover the complete viewing area of the lens, each taking half of the lens viewing area. The two outside mirrors are bigger than the inside pair and large enough to cover the viewing area of the inside pair to avoid viewing area reduction.

The convergence of the two outer mirrors is adjustable by swiveling them simultaneously and equally about their centerlines with a ganging mechanism. The two center mirrors may be fixed, or could be adjustable by being swiveled so that one side of each remains in tight contact with the other along the optical axis of the camera lens, and each makes a 45° or lesser angle to the optical axis.

The actuating mechanism for the outer mirrors is controlled by a focus mechanism independent of the viewing lens, so that the mirror convergence automatically tracks the distance to the subject. The whole assembly is to be housed in a dust and light proof housing that mounts onto the lens.

The apparatus of the invention is particularly useful in photogrammetry because of the maximization of image overlap inherent in the use of the apparatus, and because of the portability of the apparatus. The invention also comprises a method of using the apparatus of this or the parent application in photogrammetry to determine the position of an element on the image in three dimensions.

BRIEF DESCRIPTION OF THE DRAWING

FIG. 5 is a diagram of a video camera with the apparatus of the invention, as used in the method of the invention to determine the position of a subject in three dimensions.

FIG. 6 is a diagram of a video camera with the apparatus of the invention, as used in the method of the invention to determine the position of a subject in three dimensions, as used to calibrate the system for three dimensional measurement.

FIG. 7 is an image derived from the setup of FIG. 5.

FIG. 8 is a calibration image derived from the setup of FIG. 6.

DESCRIPTION OF THE PREFERRED EMBODIMENT

The parent application to this continuation in part taught the use of an apparatus to generate a pair of stereo images from a single camera, in which the convergence of the mirrors creating the pair of images is automatically controlled by the focus and/or focal length (zoom) of the camera. Since that application was filed, it has been determined that the invention may also be constructed in a way that the convergence can be controlled by focal distance to the subject, but independently of the camera itself. This might be preferable in some instances, since it would not require modification of the camera or provision of adapter rings to respond to the turning of the camera lens. If a camera has an internally-focusing lens, for example, there might not be an accessible focus ring to attach to, and it might not be desirable or possible to tap into the camera electronics to pull off a focus signal.

Instead, the embodiments of the apparatus of the invention taught herein use an independent focus sensor to determine the distance from the apparatus to the subject.

Figure 1:
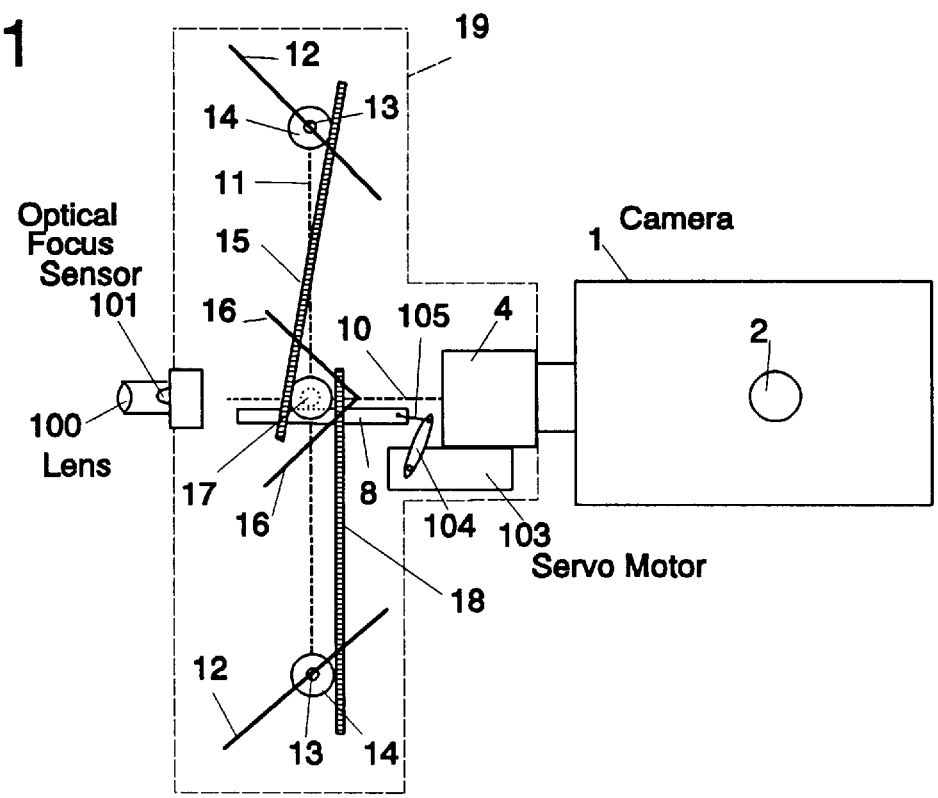
FIG. 1 shows a view of the preferred embodiment of the mechanism of the invention with automatic focus/convergence adjustment using an optical focus sensor.

FIG. 1 shows a view of the invention, shown from the bottom of the camera (1). The adapter of the invention is preferably housed in a water- and dust-tight enclosure (19), which is conventional and details of which are not shown. The adapter mounts upon camera (1) along the optical axis (10) of the lens (4) by any appropriate means, such as the tripod screw (2). No details are shown of the camera (1), since the adapter of the invention is not specific to any particular kind of camera, still, movie or video. The various parts of the adapter of the invention are mounted upon or supported by and within the housing (19) by conventional means which are not shown, for clarity in showing and describing the novel points of the invention.

The invention uses four mirrors to create the required two images: two inner mirrors (16) and two outer mirrors (12). The outer mirrors (12) are spaced apart an appropriate distance, preferably an approximation of the average human inter-ocular distance. For specialized applications, such as surveillance or the like, the spacing can be increased within the teachings of the invention. The two images from the outer mirrors (12) are reflected to the inner mirrors (16) and into the lens (4) as a single split side-by-side image.

In the preferred embodiment of the invention shown in FIG. 1, the inner mirrors (16) are fixed in position, and the outer mirrors (12) swivel on pivots (13) at their center. Dot-dashed line (11) shows that the centers of the four mirrors are coaxial along line (11), which is perpendicular to the optical axis of the lens represented by dot-dashed line (10).

The two outer mirrors (12) are ganged together so that they rotate together, but in opposite senses (i.e. one rotates clockwise when the other is rotated counterclockwise), so that the effect is to vary the convergence of the two mirrors simultaneously and equally. In the arrangement of FIG. 1, the rotation of a central gear (17) is translated into linear movement of a first (15) and second (18) rack, which ride on opposite sides of the gear. The racks (15) and (18) then translate their linear motion back into rotation of gears (14) on each mirror (12), causing the mirrors (12) to rotate on their pivots (13).

As can be seen, the first rack (15) crosses over the mirror centerline (11), to ride on the same side of its gear (14) as does the lower rack (18) on its gear (14). This is necessary to insure that the two mirrors (12) rotate in opposite senses.

The central gear (17) is rotated by the linear in-and-out movement of rack (8), which is attached to the actuating arm (104) of a servo motor (103). This servo could be any of the many servo or stepper motors available commercially. Thus, movement of the servo arm (104) causes the rack (8) to rotate the central gear (17), which in turn, through racks (15) and (18) pivots mirrors (12) equally in opposite directions.

An optical focus sensor (101), with an appropriate lens (100) if needed, determines the distance from the apparatus to the subject, and provides the control signal for the servo (103) by means which are well known to the art and are commonly used in video cameras or autofocus "point-and-shoot" still cameras. The optical sensor can be any of the focus sensors commonly used for such applications, using any optical method such as infrared or maximum contrast-detection.

Thus, the attachment of the invention permits split-screen left/right images to be produced using a conventional single-lens camera, in which the convergence of the left and right images is automatically controlled by the focus sensor.

Figure 2:
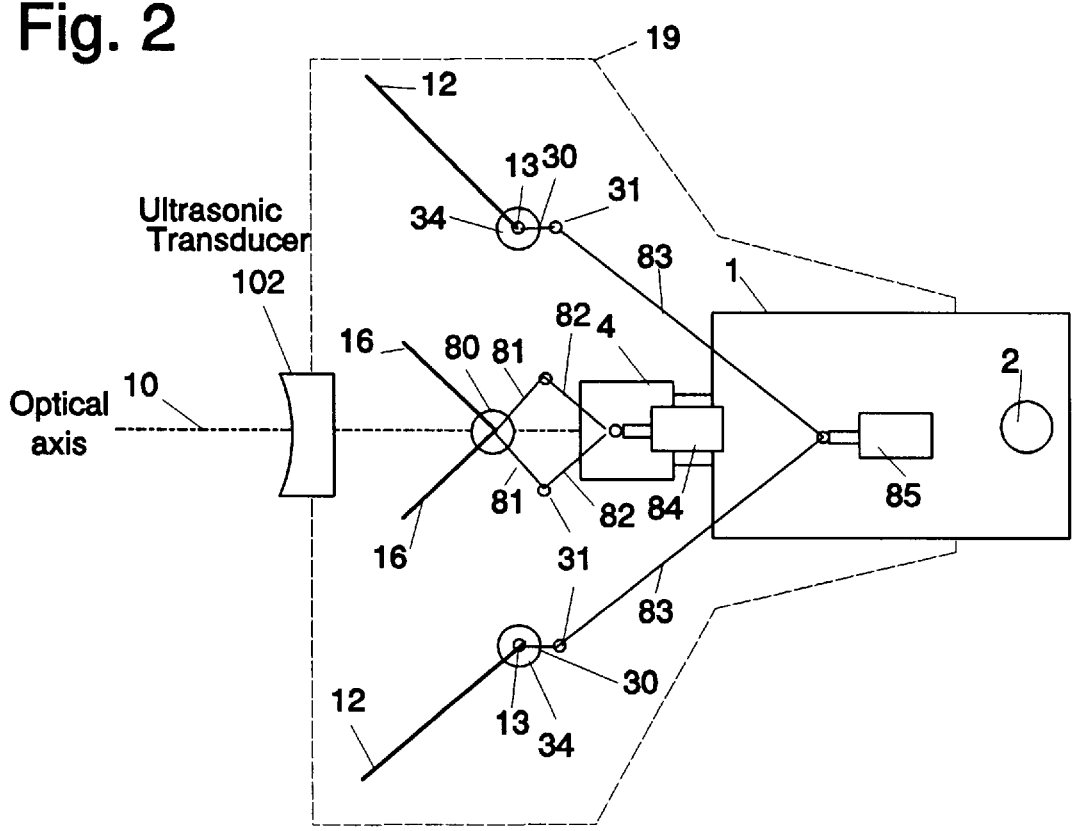
FIG. 2 shows an alternate embodiment with angle adjustment for the inner mirrors and an alternate method of tying the two outer mirrors together, and using an ultrasonic transducer for subject distance.

FIG. 2, shows another embodiment of the invention, in which an ultrasonic transducer (102) is used to determine subject distance. The ultrasonic transducer can be of the kind which has been used for many years on Polaroid® instant cameras, which bounces a series of ultrasonic "pings" off of the subject, and provides a focusing signal proportional to the delay in the return of the signal (hence distance).

The focusing signal drives an electrical actuator (85) such as a stepper motor, servo, or solenoid, which can be used to drive activation rods (83) to rotate the outer mirrors (12) through offset rods (30). Of course, this particular arrangement of rods is shown for example, and the other arrangements shown in FIGS. 1 to 4, or some other variant, could also be used. If desired, another electrical actuator (84) could be added to separately adjust inner mirrors (16), through a mechanism such as inner activating rods (82) and inner offset rods (81). The two electrical activators can be operated by electrical circuitry of any kind known to the art, such as microprocessors or discrete driver circuits, driven by the distance sensor built into the apparatus.

A further refinement of the invention replaces the single camera lens with CCD imaging sensors in generating the two images for the method of the invention. The small CCD sensor/lens modules which are commercially available could be appropriate for this use. There are two basic ways such sensors could be used: they could replace the outer mirrors, as shown in FIG. 3, or the inner mirrors, as shown in FIG. 4.

Figure 3:
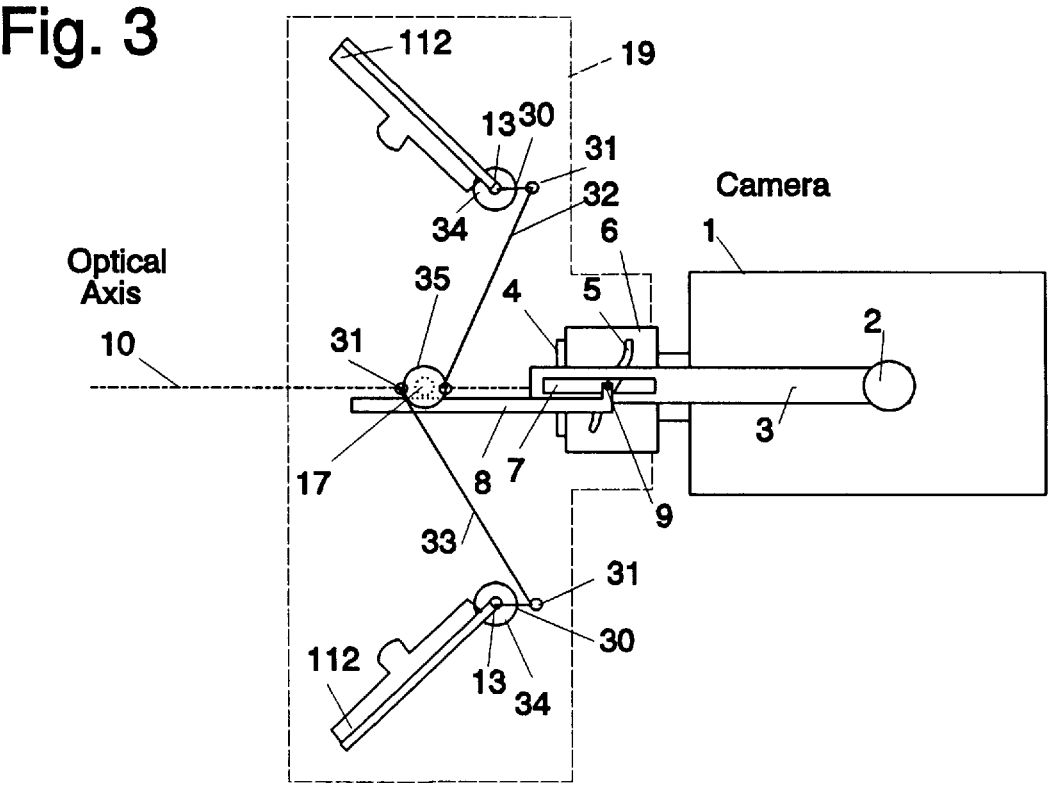
FIG. 3 shows another alternate embodiment using CCD imaging sensors in place of the outer mirrors, with the convergence of the imaging sensors being controlled by the focus of a video camera in the manner of the parent application.

FIG. 3 shows an embodiment of the invention in which the outer mirrors are replaced by a pair of CCD image sensor modules (112). The mechanism of the apparatus, which controls the convergence of the sensors (112) is driven by the autofocus mechanism of a video camera (1), in the method of the parent application to this CIP. The video camera (1) serves as both aiming and focusing means for the apparatus. As taught in the parent application, two activating rods (32) and (33) connect diametrically opposed points on central disk (35) to offset rods (30) attached to the CCD sensor (112) vertical pivots (13), which are located at the inner end of the sensors. Pivot connections (31) ensure free movement of the rods, as the mechanism is moved. As the lens ring (4) is focused toward a subject closer to the lens, the pin (9) is moved outwards by slot (5), pushing rack (8) away. This rotates the pinion gear (17), which in turn rotates the central disk (35) counterclockwise. As central disk (35) is rotated counterclockwise, activating rods (32) and (33) move outwards, pushing on offset rods (30) and pivoting the CCD sensors (112) inward. This causes the field of view of the CCDs (12) to converge.

Figure 4:
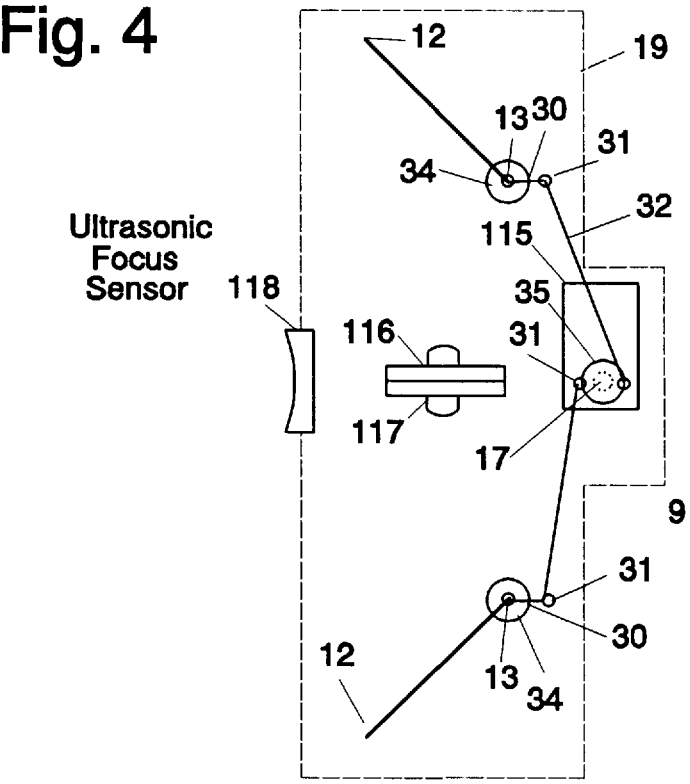
FIG. 4 is a schematic diagram of another alternate embodiment using CCD imaging sensors in place of the inner mirrors to generate the two images, and an ultrasonic transducer to determine subject distance.

FIG. 4 carries this system to the next step, by eliminating the camera entirely. Instead, the dual image is created by a pair of CCD sensors (116) and (117), mounted back-to-back at the position of the inner mirrors in the other embodiments. The outer mirrors (12) pivot around their inner ends (34) by pushrods (30), pivots (31) and pivot rods (32). The pivot rods (32) are attached to opposite sides of a central actuating disk (35) which is turned by a servo or stepper motor (115) under the control of an ultrasonic focus sensor (118).

In either of the two arrangements of FIGS. 3 or 4, the two CCD's will need to be carefully synchronized so that the images are captured at exactly the same instant.

It will be understood that the mechanical arrangements (pushrods, racks, servos, etc.) and types of focus sensors (optical, ultrasonic or camera) can be "mixed and matched" within the teachings of the invention, and the examples given show specific combinations of types which are not meant to be exhaustive.

The apparatus of the invention can be easily used to determine the position of a subject in three-space (x, y and z axes), and, once calibrated, will allow such measurements to be made even by portable equipment without difficulty. FIGS. 5 and 6 show the apparatus of the invention as it would be used in the method of the invention. In FIG. 5, one is attempting to determine the position of fly (135), as it flies through the field of view of the device. The adapter of the invention (133), attached to video camera (130) is pointed in the direction of view. The lens (131) is focused, and the outer mirrors (132) and (136) are pivoted so as to converge their field of view, according to the teachings of the invention. The fields of view of mirrors (132) and (136) are shown by dash-dot lines (134) and (149), respectively. The depth of focus of the images from the two mirrors are shown as pairs of arcs (148) and (147), respectively, which overlap covering the distance of the fly (135), indicating that the depth of focus of the lens (131) includes the area of the subject and its surroundings.

The angle (137) of the mirror, relative to the optical axis of the lens (131), is measured, either directly using a shaft digitizer on the pivot or some other means appropriate to the mechanical design of the apparatus, or by inference from the focus distance of the lens (131), or from the focus sensor if the embodiment of the apparatus includes one.

The measurement method of the invention is as follows:

First, calibrate the apparatus (see FIG. 6) by the steps of:
1. Point the apparatus at one of a plurality of calibration targets (139) having known positions in three-space, the targets being selected to fill the image frame and encompass the depth of field of the lens at the target distance. Preferably, sixteen or more targets will be used, at varying distances from the camera. This implies that the size of the targets will vary by their distance from the apparatus, so as to fill the field of view at each distance. For each target, a plurality of points of known position will be measured. Only twelve measurement points (141) are shown in the example, arranged in three rows (142)(143) and (144), with varying heights. The actual arrangement of the calibration target measurement points is not important.
2. Focus the image on the camera (130), such that all of the measurement points on the target are within the depth of field of the lens. Simultaneously, adjust the convergence angle (140) of the mirrors (132) and (136), according to the teachings of the invention, such that the fields of view of the left and right images overlap completely over the area of the depth of field. This results in two video images (FIG. 8)—left (152) and right (153), and an indication of the mirror angle (140).
3. For each of the measurement points, on each of the two images:
   a) measure the two dimensional position of the image of the point (160). For example on the left image the image of measurement point (160) appears at x (155) and y (157), and on the right image at x (156) and y (158). The x and y coordinates can be relative to a (0,0) in the middle of each axis, as shown, or relative to any other system of coordinates desired. If desired, an "angle and distance" measure ($\rho$ and $\theta$) from the center of the image could be used, with appropriate modification to the computation.
   b) Enter the actual coordinates of the measurement point in three-space (relative to the location of the apparatus).
   c) Repeat for the rest of the measurement points on the target.
4. From the x and y coordinates stored for each measurement point on the target, and the actual known coordinates for the measurement points, calculate a calibration map for positions in three-space, for that angle of the mirrors (i.e. subject distance).
5. Repeat steps 3 through 4 for the rest of the calibration targets, at a plurality of distances (i.e. mirror angles)

Then, to use the apparatus and method (FIG. 5):
1. Aim and focus the apparatus at the subject (135).
2. Record the position of the subject on each image ($X_L$ and $Y_L$ on the left (150) image, $X_R$ and $Y_R$ on the right (151)
3. Measure or derive the angle (137) of the mirrors (136).
4. Select the calibration map based on the angle (137).
5. Reconstruct the three-dimensional position of the subject (135), by interpolation of the x and y positions from each image and using the selected calibration map, chosen by the angle in step 4.

For an example of a method of computation of the position of an object from two images, see the published thesis: "Rational Design for Close-Range Photogrammetry", Genaro T. Marzan, University of Illinois at Urbana-Champaign, Ph.D. 1976; University Microfilms International Dissertation Information Service number 76-16,161 (220 pages).

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A lens attachment for creation of three-dimensional images using a single lens, for use with lenses having a field of view symmetrical about an optical axis and a focusing means for focusing the lens to a selected distance, comprising:
   a) a right and a left inner mirror, both inner mirrors being located in front of the lens facing inwardly along the optical axis of the lens toward the lens, covering substantially all of the field of view of the lens, the inner mirrors being connected together at one edge at the optical axis of the lens, such that the two inner mirrors form an acute angle symmetrical about the optical axis of the lens;
   b) a right and a left outer mirror, both being larger than the inner mirrors and located outward of the inner mirrors, facing outward toward a subject, such that the substantially all of the field of view of the inner mirrors is covered by the outer mirrors, the outer mirrors being pivotable about a vertical axis;
   c) ganging means for simultaneously pivoting the outer mirrors about their vertical axes in opposite senses, having a control input for actuating the ganging means, such that a movement of the control input causes the right and left outer mirrors to pivot equally, oppositely and simultaneously, such that a movement of the control input in one direction causes the fields of view of the outer mirrors to converge, and a movement of the control input in the opposite direction causes the fields of view of the outer mirrors to diverge; and
   d) distance measuring means for measuring the distance between the apparatus and a subject, having a control output proportional to the distance between the apparatus and the subject, and
   e) driving means for moving the control input of the ganging means in response to the control output of the distance measuring means, such that the fields of view of the outer mirrors overlap at the distance measured by the distance measuring means.

2. The lens attachment of claim 1, in which each of the inner mirrors is mounted at an angle of 45° to the optical axis of the lens.

3. The lens attachment of claim 1 further comprising tandem means for adjusting the angle of the inner mirrors to the optical axis of the lens, such that both inner mirrors maintain the same angle to the optical axis of the lens as the angle is adjusted.

4. The lens attachment of claim 3 in which the tandem means for adjusting the angle of the inner mirrors comprises:
   a) a center block located at the intersection of the optical axis of the lens and the centerline of the outer mirrors, having a first bore oriented along the optical axis of the lens, and a second bore along the centerline of the mirrors;
   b) a center pivot at a point where the edges of the two inner mirrors are connected together, the connection between the two mirrors being movable;
   c) a slide located on the centerline of the mirrors, passing through the second bore in the center block and centered on the optical axis of the lens, having two ends and a length sufficient that the ends of the slide extend at least past the inner mirrors on the centerline of the mirrors;
   d) two sliding pivots, each having a bore through which the slide is slidably inserted, and a pivot upon which one of the inner mirrors is pivotably mounted at its centerline;
   such that when the center pivot is moved along the optical axis toward the center block, the sliding pivots to which the inner mirrors are attached slide outward on the slide and the inner mirrors pivot thereon, flattening the angle between the inner mirrors and the optical axis and maintaining each inner mirror at the same angle to the optical axis of the lens.

5. The attachment of claim 4, in which the first bore of the center block is threaded; and the attachment further comprises a threaded adjustment rod having matching threads, passing through the first bore of the center block and being attached to the center pivot, such that the center pivot is moved along the optical axis of the lens as the threaded adjustment rod is turned within the threaded first bore.

6. The lens attachment of claim 3 in which the tandem means for adjusting the angle of the inner mirrors comprises:
   a) a center pivot at a point where the edges of the two inner mirrors are connected together, the connection between the two mirrors being movable;
   b) a first ganging rod, having a first end flexibly attached to an inner mirror near the edge of the mirror most remote from the center pivot and a second end flexibly attached to the outer mirror located on the same side of the optical axis of the lens;
   c) a second ganging rod, having a first end flexibly attached to the other inner mirror near the edge of the mirror most remote from the center pivot at the same point of attachment as the first end of the first ganging rod is attached to its inner mirror, and a second end flexibly attached to the outer mirror located on the same side of the optical axis of the lens at a point on the outer mirror which is the same point at which the second end of the first ganging rod is attached to its outer mirror;
   such that when the outer mirrors are moved upon their pivots, the first and second ganging rods cause the inner mirrors to move equally, oppositely, and simultaneously.

7. The attachment of claim 6, in which the point of attachment of the second end of the first and second ganging rods to the outer mirrors is near the center of the outer mirrors.

8. The attachment of claim 6, in which the point of attachment of the second end of the first and second ganging rods to the outer mirrors is near the pivot point of the outer mirrors.

9. The attachment of claim 1, in which the ganging means comprises:
   a) a center pinion gear located on the centerline of the mirrors;
   b) a mirror pinion gear located at the vertical axis of one of the outer mirrors, such that turning the mirror pinion gear pivots the outer mirror along its vertical axes;
   c) a rack operatively connecting the center pinion gear to the mirror pinion gear, such that turning the center pinion gear moves the rack linearly, causing the mirror pinion gear to rotate and pivot the outer mirror; and
   d) tying means for causing the other outer mirror to move equally and oppositely to the outer mirror having the mirror pinion gear.

10. The attachment of claim 9 in which the tying means for causing the outer mirror to pivot comprises a ganging rod connected to one end of the right outer mirror and to the opposite end of the left outer mirror.

11. The attachment of claim 9 in which the tying means for causing the outer mirror to pivot comprises a second mirror pinion gear and a second rack connecting the center pinion gear to the second mirror pinion gear, such that turning the center pinion gear moves the second rack linearly, causing the second mirror pinion gear to rotate and pivot the outer mirror equally and oppositely to the pivoting of the other outer mirror.

12. The attachment of claim 9 in which the control input of the ganging means comprises a control rack connected to the center pinion gear, such that linear movement of the control rack causes the center pinion gear to rotate.

13. The attachment of claim 1 in which the distance measuring means is an optical focus sensor.

14. The attachment of claim 1 in which the distance measuring means is an ultrasonic transducer.

15. The attachment of claim 1, in which the ganging means for pivoting the outer mirrors comprises a pair of rods having outer ends attached to the outer mirrors, spaced a distance from the vertical axis about which the outer mirrors are pivoted, and inner ends connected to each other and to an actuating rod located parallel to the optical axis of the lens.

16. The attachment of claim 1, in which the vertical axis about which the outer mirrors pivot is located at the inner end of the outer mirrors, the outer mirrors further comprise an offset rod having a first end connected to the outer mirror at the vertical axis thereof, and extending rearwardly from the pivot, and having a second end, and the ganging means for pivoting the outer mirrors comprises a pair of rods having outer ends attached to the second end of the offset rods, and inner ends connected to each other and to an actuating rod located parallel to the optical axis of the lens.

17. The attachment of claim 1, in which the driving means comprises an electrical actuator having an electrical input for an electrical signal representative of the focus of the lens and a mechanical output connected to the control input of the ganging means, having a movement responsive to the electrical signal on an electrical input, such that the electrical signal representative of the focus of the lens adjusts the convergence of the mirrors appropriately to the point of focus of the lens.

18. The attachment of claim 17, in which the electrical actuator is a solenoid.

19. The attachment of claim 17, in which the electrical actuator is a stepper switch.

20. The attachment of claim 17, in which the electrical actuator is a servo.

* * * * *